(12) United States Patent
Dong

(10) Patent No.: US 9,418,493 B1
(45) Date of Patent: Aug. 16, 2016

(54) METHODS AND SYSTEMS FOR DATA ANALYTICS

(71) Applicant: The Boeing Company, Chicago, IL (US)

(72) Inventor: Jian Dong, Irvine, CA (US)

(73) Assignee: The Boeing Company, Chicago, IL (US)

( * ) Notice: Subject to any disclaimer, the term of this patent is extended or adjusted under 35 U.S.C. 154(b) by 5 days.

(21) Appl. No.: 14/700,333

(22) Filed: Apr. 30, 2015

(51) Int. Cl.
*G07C 5/08* (2006.01)
*G07C 5/02* (2006.01)

(52) U.S. Cl.
CPC .............. *G07C 5/0808* (2013.01); *G07C 5/02* (2013.01); *G07C 5/085* (2013.01)

(58) Field of Classification Search
CPC ......... G07C 5/0808; G07C 5/085; G07C 5/02
See application file for complete search history.

(56) References Cited

U.S. PATENT DOCUMENTS

2012/0290166 A1* 11/2012 Wallace ................. G07C 5/085
701/29.2
2014/0222325 A1 8/2014 Followell et al.

\* cited by examiner

*Primary Examiner* — Rodney Butler
(74) *Attorney, Agent, or Firm* — McDonnell Boehnen Hulbert & Berghoff LLP

(57) ABSTRACT

A method includes receiving a stream of sensor data regarding operating conditions of a vehicle, and processing first and second data sets of the stream of sensor data in time and frequency domains. The method also includes identifying differences within and between processing results from processing the first and second data sets, and determining that at least one difference in the identified differences is greater than or equal to one or more predefined thresholds. Further, the method includes, based on determining the at least one difference in the identified differences being greater than or equal to the one or more predefined thresholds, recording one or more processing results corresponding to the identified at least one difference in a data index map (DIM), and analyzing contents of the DIM to evaluate operating conditions of the vehicle.

20 Claims, 9 Drawing Sheets

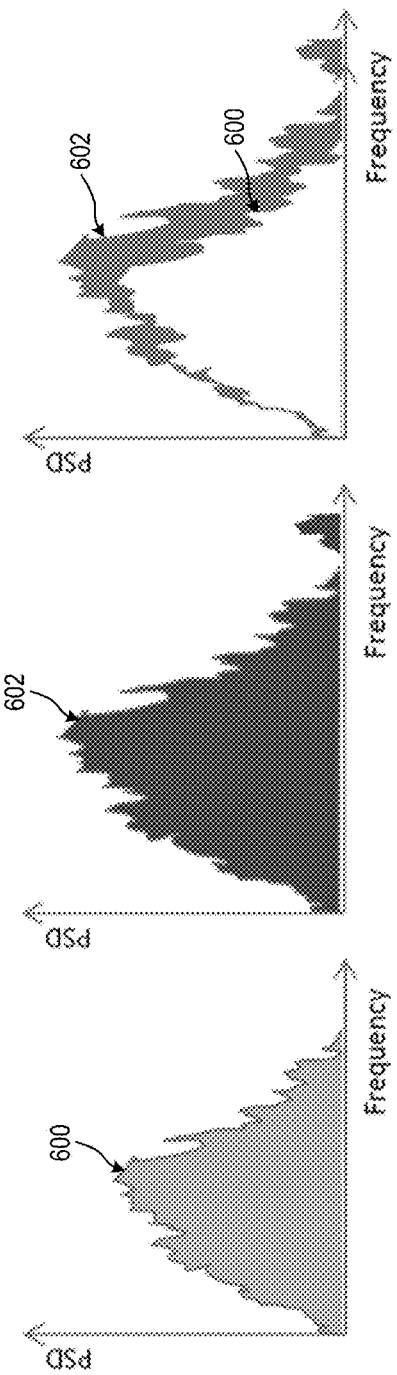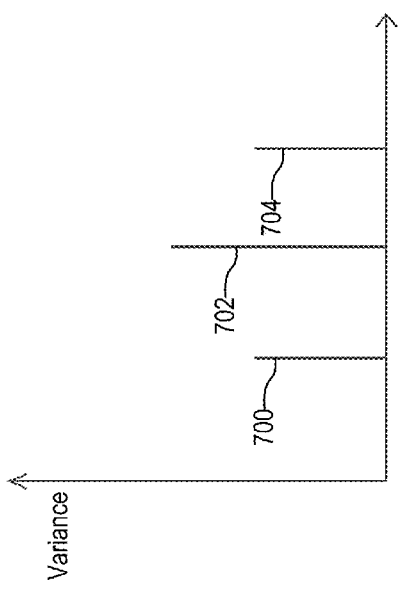

METHODS AND SYSTEMS FOR DATA ANALYTICS

BACKGROUND

A vehicle health management system may be used to monitor the operating health of a vehicle, such as an aircraft, a spacecraft, a ground vehicle, a watercraft, or other machinery. An example vehicle health management system includes a data processing system and one or more sensors. The sensors may be integrated with a vehicle or otherwise configured to generate data relating to operating conditions of the vehicle, and the data processing system may be configured to receive data from the sensors and process the data to determine a current state or health of the overall vehicle or of one or more particular vehicle components, to predict a future state the vehicle, and perhaps to perform or trigger other actions based on the processing of the data.

Vehicles commonly incorporate data processing systems for receiving and processing sensor data in real time and/or for storing the sensor data for offline processing, such as during a vehicle maintenance operation. In one example, an automobile may include various sensors for collecting data relating to operating conditions of an engine, safety systems, fluid levels, climate control systems, and the like. In this example, the automobile also includes a data processing system for processing the sensor data and notifying a user of the operating conditions of the vehicle, such as by activating a check-engine light or by providing other alerts.

In another example, a vehicle management system monitors the health of a fleet of many vehicles, such as a fleet of aircraft. In this example, each aircraft may include numerous sensors, such as acoustic sensors, environmental sensors, accelerometers, stress/strain sensors, pressure sensors, and the like, and each sensor may be configured to continuously, intermittently, or periodically collect data relating to the aircraft. Like in the above example, each aircraft may include a data processing system for receiving and processing data from the sensors in real-time to assist a pilot to operate the aircraft, for instance.

In this example, the data processing system of each aircraft is also configured to communicate the sensor data continuously to a "central" data processing system. Generally, the central data processing system receives very large amounts of data from the fleet of vehicles, which presents challenges in effectively processing the data to provide useful health status information. Consequently, the central data processing system may be configured to electronically store the received sensor data for offline processing when there is a need, such as a need to investigate an abnormal operating condition, an equipment failure, or other accident, or to help manage the health of the fleet of aircraft as a whole. However, even the offline processing of such large amounts of data typically requires significant processing time and resources to just identify data that is relevant or useful for further analytics.

It is generally desirable to improve on the existing systems or at least to provide one or more useful alternatives to help to make vehicle health management systems more efficient and faster in the processing of data and to improve real-time intelligence regarding the health status of one or more vehicles.

SUMMARY

In an example embodiment, a method implemented by a computing device for data stream analytics includes controlling a sensor to acquire sensor data regarding operating conditions of a vehicle. The sensor may be configured to sense one or more of acoustics, environmental conditions, acceleration, stress/strain, pressure, or vehicle component operating conditions. The method also includes receiving a stream of the sensor data, processing a first data set of the stream of the sensor data in a time domain and in a frequency domain, and processing a second data set of the stream of the sensor data in the time domain and in the frequency domain. In one example, the first data set and the second data set are adjacent data sets of the stream of the sensor data. Further the method includes identifying one or more of differences within first processing results from processing the first data set, differences within second processing results from processing the second data set, and differences between the first processing results and the second processing results, and determining whether at least one difference in the identified differences is greater than or equal to one or more predefined thresholds. Based on determining that the at least one difference in the identified differences is greater than or equal to the one or more predefined thresholds, the method includes recording one or more processing results corresponding to the identified at least one difference in a data index map (DIM). In the present example, the method also includes analyzing contents of the DIM to evaluate operating conditions of the vehicle.

In another example embodiment, a system for data stream analytics includes a plurality of memory units including data stream memory (DSM) units configured as a pathway for a data stream to a permanent data storage, input data memory (IDM) units configured as input data buffers, output data memory (ODM) units configured as output data buffers, and a first set of data processing result (DPR) memory units and a second set of DPR memory units that are configured to store processing results. The system also includes a processor communicatively coupled with the plurality of memory units and configured to provide a data stream through the DSM units to the permanent data storage, copy a first data set of the data stream from the DSM units to the IDM units, generate a first processing result of the first data set using predefined analytics algorithms, and move the first processing result to the first set of DPR memory units. Further, the processor is configured to copy a second data set of the data stream from the DSM units to the IDM units, generate a second processing result of the second data set using the predefined analytics algorithms, move the first processing result in the first set of DPR memory units to the second set of DPR memory units, and move the second processing result to the first set of DPR memory units. In addition, the processor is configured to identify that at least one difference within the first processing result, within the second processing result, or between the first processing result and the second processing result is greater than or equal to one or more predefined thresholds, and to record one or more processing results corresponding to the identified at least one difference in a data index map (DIM).

In a further example embodiment, a system for data stream analytics includes a plurality of memory units including data stream memory (DSM) units configured as a pathway for a data stream to a permanent data storage, input data memory (IDM) units configured as input data buffers, output data memory (ODM) units configured as output data buffers, and a first set of data processing result (DPR) memory units and a second set of DPR memory units. In this embodiment, each of the first set of DPR memory units and the second set of DPR memory units configured to store processing results. Further, this system includes a processor having at least three processor cores. The processor is communicatively coupled with the memory units and configured to provide a data stream through the DSM units to the permanent data storage, and to copy a first data set of the data stream and a second data set of the data stream from the DSM units to the IDM units. The processor is also configured to generate, using a first processor core, a first processing result of the first data set using predefined analytics algorithms, and to generate, using a second processor core, a second processing result of the second data set using the predefined analytics algorithms. In addition, the processor is configured to move the first processing result to the first set of DPR memory units, move the second processing result to the second set of DPR memory units, and to identify, using a third processor core, that at least one difference within the first processing result, within the second processing result, or between the first processing result and the second processing result is greater than or equal to one or more predefined thresholds. In this example, the processor is also configured to record one or more processing results corresponding to the identified at least one difference in a data index map (DIM).

It should be understood that the description provided in this summary section and elsewhere in this document is intended to illustrate aspects of the present disclosure by way of non-limiting example. Generally, the features, functions, components, and advantages that are discussed herein can be achieved independently in various embodiments or may be combined in yet other embodiments, further details of which are disclosed in the following description and the accompanying drawings.

BRIEF DESCRIPTION OF THE DRAWINGS

FIGS. 6A-6C illustrate frequency domain display data according to an example embodiment.

FIG. 7 illustrates time domain display data according to an example embodiment.

DETAILED DESCRIPTION

Figure 1:
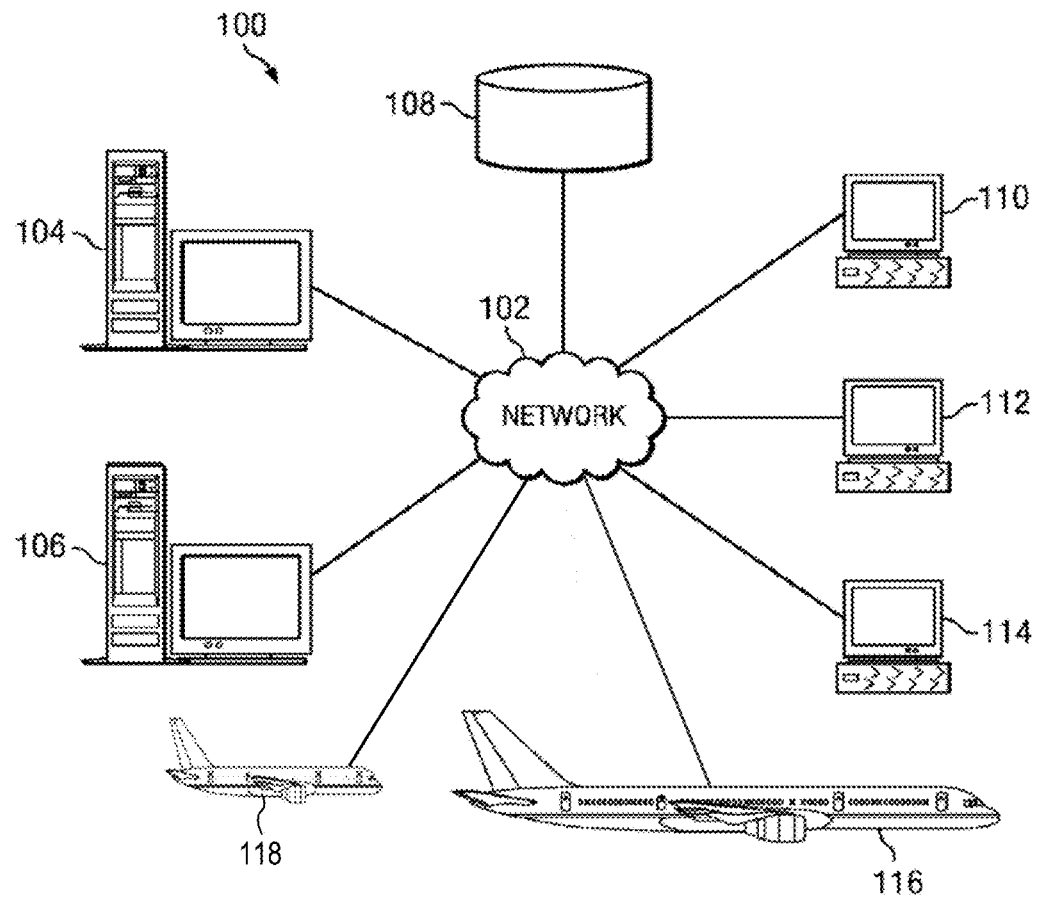
FIG. 1 is a diagrammatic view of a system according to an example embodiment.

The example embodiments described herein are not meant to be limiting. It will be readily understood that the aspects of the present disclosure, as generally described herein, and illustrated in the figures, can be arranged, substituted, combined, separated, and designed in a wide variety of different configurations, without departing from the spirit or scope of the subject matter presented herein.

Within examples, innovative methods and systems for data processing and analytics are disclosed. The methods and systems disclosed herein may be particularly useful for effectively processing large data sets or "big" data, which generally refers to data that is received in high volumes, at high speeds, and/or in a range of different types from many different sources. Commonly used hardware and software tools may be unable to capture, process, and extract useful information from big data (for instance, ranging from a few terabytes to tens of petabytes or more of data) within tolerable time frames. In addition to processing large data sets, the methods and systems disclosed herein may also be useful for effectively processing relatively small data sets.

For illustration purposes, features, functions, and other aspects are described with respect to health management systems that are configured to process sensor data received from vehicles, such as aircraft. However, the features and functions disclosed herein may also be applicable to other types of vehicles, machinery, and devices, and to other types of data. Generally, the use of health management systems may have various benefits. For example, a health management system may be able to identify anomalies or inefficient performance of vehicle components and to take intelligent corrective action before minor issues develop into major repairs and increased vehicle downtime. The health management system may also be able to identify efficient or acceptable performance of vehicle components and to delay maintenance that is not otherwise needed. Consequently, the health management system may be used to reduce the time that a vehicle is out of service for maintenance and repairs. Further, if an immediate repair is need, the health management system may be able to assist with planning the repair and providing logistic support to enable the repair.

In one example, a computer-implemented method may include, among other possible features and functions, generating processing results by processing data streams (e.g., streams of big sensor data relating to numerous vehicles) in a time domain and in a frequency domain, visualizing the processing results in real time, triggering real-world actions based on the processing results, generating new, smaller and useful, data sets (such as a data index map (DIM)) that captures information from the data streams, analyzing the new data sets to evaluate the health of one or more vehicles, and/or performing real-world actions based on evaluating the health of the vehicle(s). The method may also include analyzing the new data sets to identify other related data in the received big data streams for further processing and analytics.

Referring now to the figures, FIG. 1 is a block diagram of an example system 100 in which embodiments of the present disclosure may be implemented. The system 100 includes network 102 that may be used to facilitate wired or wireless communications links between various devices and computers. In FIG. 1, servers 104, 106 are communicatively coupled to the network 102 along with a representative storage unit 108. In addition, client computers 110, 112, and 114 are communicatively coupled to network 102. The client computers 110-114 may be, for example, personal computers, hand-held devices, or network computers. In the present example, the server 104 may provide data, such as boot files, operating system images, and applications to client computers 110-114.

FIG. 1 also illustrates aircraft 116, 118 that are communicatively coupled to the network 102 and that may exchange information with the servers 104, 106 and the client computers 110-114. The aircraft 116, 118 may exchange data with different computers through a wireless communications link while in-flight or any other type of communications link while on the ground. The system 100 may include additional servers, clients, aircraft and other vehicles, and other devices that are not shown.

In one example, communications through the system 100 may be facilitated over the Internet, and the network 102 may represent a worldwide collection of networks and gateways that use the Transmission Control Protocol/Internet Protocol (TCP/IP) suite of protocols to communicate with one another. In other examples, the system 100 also may be implemented as a number of different types of networks, such as for example, a cellular or satellite communications network, an intranet, a local area network (LAN), or a wide area network (WAN).

Figure 2:
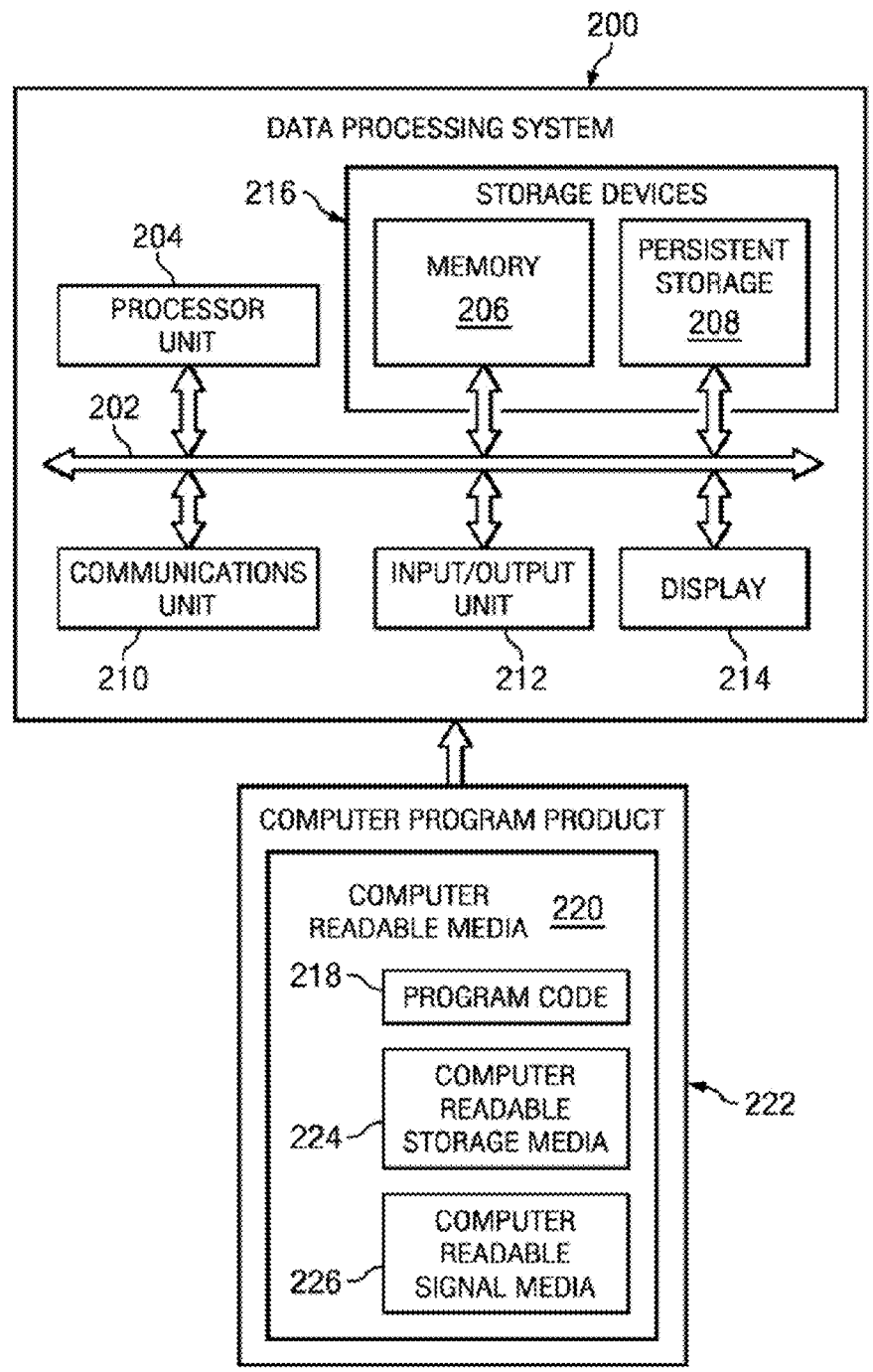
FIG. 2 is a block diagram of a data processing system according to an example embodiment.

Referring now to FIG. 2, an example data processing system 200 is illustrated. The data processing system 200 may be used to implement servers and clients, such as the servers 104, 106, the client computers 110-114, and data processing systems that may be incorporated in the aircraft 116, 118 in FIG. 1. In FIG. 2, the data processing system 200 includes a bus 202 that communicatively couples a processor unit 204, memory 206, persistent storage 208, communications unit 210, input/output (I/O) unit 212, and display 214.

In the present example, the processor unit 204 is configured to execute software instructions that may be stored in the memory 206. The processor unit 204 may include one or more high performance programmable processors, multi-core processors, or other types of processors.

The memory 206 and the persistent storage 208 are examples of storage devices 216. Generally, a storage device is a piece of hardware that is capable of storing information, for example, data, program code, and/or other suitable information either on a temporary basis and/or a permanent basis. The memory 206, in these examples, may be a random access memory or any other suitable volatile or non-volatile storage device. The persistent storage 208 may be a hard drive, a flash memory, a rewritable optical disk, a rewritable magnetic tape, or some combination of the above. The media used by the persistent storage 208 also may be removable, such as a removable hard drive or flash memory.

The communications unit 210, in these examples, provides for communications with other data processing systems or devices. For instance, the communications unit 210 may be a network interface card. Generally, the communications unit 210 may provide communications through the use of either or both of physical and wireless communications links.

The input/output unit 212 allows for input and output of data with other devices that may be connected to the data processing system 200. For example, the input/output unit 212 may provide a connection for user input through a keyboard, a mouse, a touchpad, a microphone for receiving voice commands, and/or some other suitable input device. The input/output unit 212 may send output to a printer and/or to the display 214, which provides a mechanism to display information to a user.

Instructions for the operating system, applications, and/or programs may be located in the storage devices 216, which are in communication with the processor unit 204 through the bus 202. Generally, the processes and functions of the disclosed embodiments may be performed by the processor unit 204 using the instructions stored in a functional form on different physical or tangible computer readable media, such as the memory 206 and/or the persistent storage 208. The computer-implemented instructions are referred to as program code, computer usable program code, or computer readable program code that may be read and executed by a processor in the processor unit 204.

FIG. 2 also illustrates program code 218 that is located in a functional form on computer readable media 220. The computer readable media 220 may be selectively removable and may be loaded onto or transferred to the data processing system 200 for execution by the processor unit 204. In the present example, the program code 218 and the computer readable media 220 form computer program product 222. The computer readable media 220 may include computer readable storage media 224 or computer readable signal media 226. The computer readable storage media 224 may take various forms, such as an optical or magnetic disk, a hard drive, a thumb drive, or a flash memory, that is connected to the data processing system 200. In some instances, computer readable storage media 224 may not be removable from the data processing system 200. In these illustrative examples, the computer readable storage media 224 is a non-transitory computer readable storage medium.

Alternatively, the program code 218 may be transferred to the data processing system 200 using computer readable signal media 226. The computer readable signal media 226 may be, for example, a propagated data signal containing the program code 218. For example, the computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

The different components illustrated for the data processing system 200 are not meant to provide architectural limitations to the manner in which different embodiments may be implemented. Different embodiments may be implemented in a data processing system including components in addition to or in place of those illustrated for the data processing system 200. Other components shown in FIG. 2 can be varied from the illustrative examples shown. Generally, the different embodiments may be implemented using any hardware device or system capable of running program code.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

Figure 3:
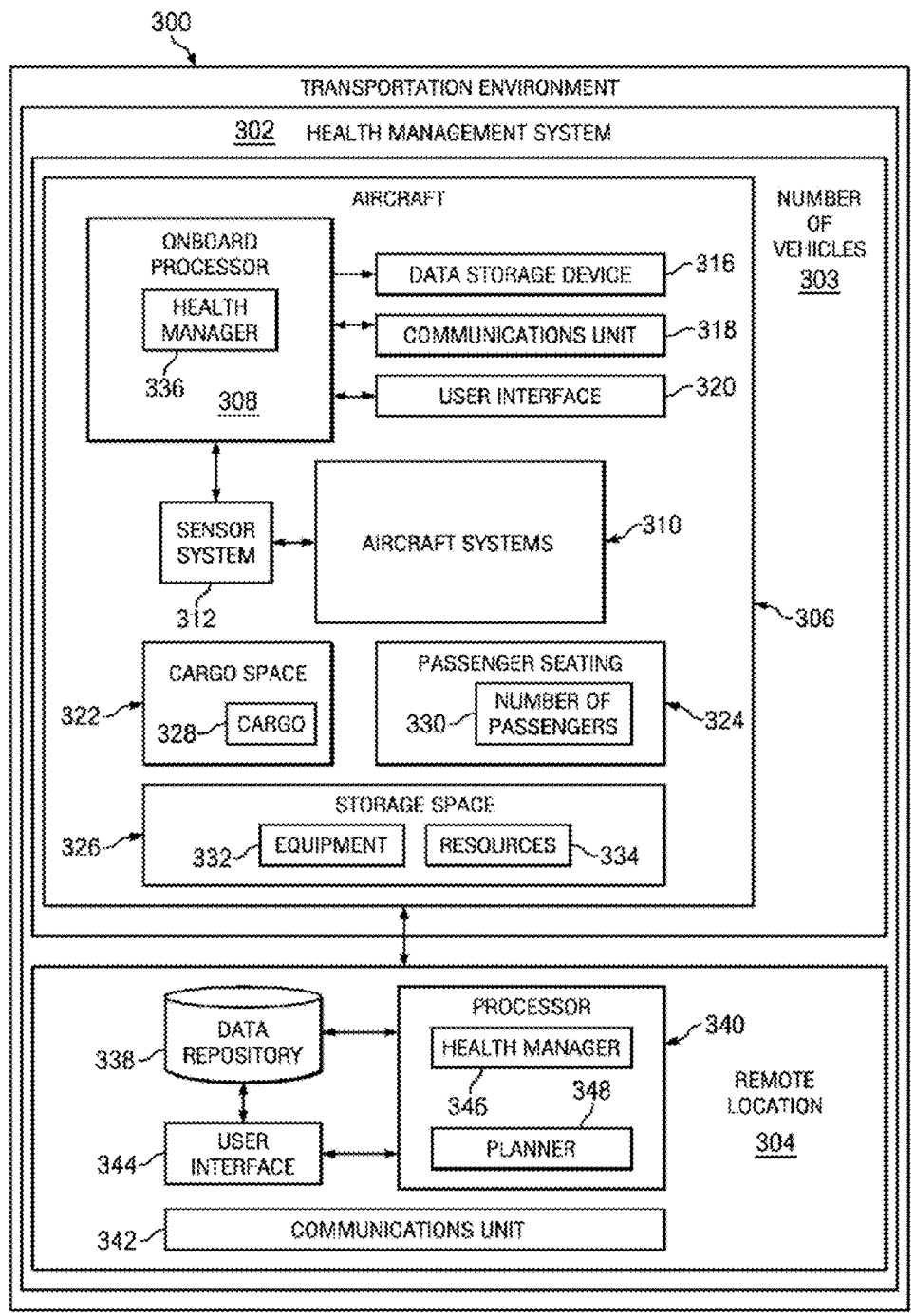
FIG. 3 is a block diagram of a transportation environment according to an example embodiment.

Referring now to FIG. 3, an example transportation environment 300 may be implemented using a network environment, such as system 100 of FIG. 1, for example. The transportation environment 300 includes a health management system 302. The health management system 302 may be implemented using one or more data processing systems, such as the data processing system 200 in FIG. 2. As illustrated, the health management system 302 includes a number of vehicles 303 and a remote location 304. The vehicles 303 and remote location 304 may communicate using a wireless network, in an illustrative example.

The vehicles 303 may be any type of vehicle suitable for transportation, such as aircraft, rotorcraft, ground vehicles, sea vessels, submarines, spacecraft, manned vehicles, unmanned vehicles, and/or any other suitable vehicle. In FIG. 3, an aircraft 306 is an illustrative example of one implementation of the vehicles 303.

In the present example, the aircraft 306 includes onboard processor 308, various aircraft systems 310, sensor system 312, data storage device 316, communications unit 318, user interface 320, cargo space 322, passenger seating 324, and storage space 326.

The cargo space 322 may be any location or area suitable for storing cargo 328. The passenger seating 324 may be any location or area suitable for holding a number of passengers 330. The storage space 326 may be any location or area suitable for storing equipment 332 and/or resources 334. The equipment 332 may include, for example, without limitation, beverage carts, galley equipment, first aid equipment, and/or any other suitable aircraft equipment, and the resources 334 may include, for example, without limitation, fuel, food, beverages, oxygen, and/or any other suitable resources for aircraft 306.

The onboard processor 308 is an illustrative example of one implementation of the processor unit 204 in FIG. 2. The onboard processor 308 includes an onboard health manager 336, which can be a software-based component that continually receives data from the sensor system 312 and/or other aircraft systems. The onboard health manager 336 uses the data to assess, diagnose, transmit, and report on the health of the aircraft systems 310. The onboard health manager 336 uses communications unit 318 to transmit information about the health of the various aircraft systems 310 to the remote location 304. The communications unit 318 is an illustrative example of one implementation of communications unit 210 in FIG. 2.

The aircraft systems 310 may include, for example, without limitation, engine systems, landing gear components, flight control systems, guidance systems, navigation systems, structural component systems (including, for example, a fuselage, wings, flaps, rudders, ailerons, elevators, vertical and horizontal stabilizers, nacelle, winglets, and the like) and/or any other suitable aircraft systems. The aircraft systems 310 may also include one or more systems of the user interface 320, the cargo space 322, the storage space 326, or the passenger seating 330.

The remote location 304 may be, for example, a back office, a ground station, a vehicle serving as a remote location, and/or any other suitable location distinct from one or more of the vehicles 303. In the illustrated example, the remote location 304 includes data repository 338, off-board processor 340, communications unit 342, and user interface 344.

The data repository 338 may be used to store data received from the various vehicles 303. The data repository 338 may also support a number of algorithms used by processor 340 to process and perform analytics of the data received from the vehicles. In an illustrative example, the onboard health manager 336 may receive data from the sensor system 312 and/or from other aircraft systems, and transmit the data to the processor 340 for health assessment, diagnoses, and reporting. In another illustrative example, the onboard health manager 336 may process and assess the data received from sensor system 312 and/or other aircraft systems 310 to diagnose a number of issues, and send the diagnostic results to the processor 340 for further processing, such as maintenance or operational planning.

The processor 340 may be an embodiment of the processor unit 204 in FIG. 2. As illustrated in FIG. 3, the processor 340 includes components, such as remote health manager 346 and planner 348. In one embodiment, the remote health manager 346 receives data collected by the sensor system 312 and uses the received data to assess, diagnose, transmit, and report on the health of the aircraft 306. The remote health manager 346 may also transmit information about the health of the aircraft to the planner 348.

In one example, the planner 348 is a software-based component that uses information about the health of the aircraft 306 to plan maintenance and operational tasks. The planner 348 may display plans on a graphical user interface 344, in an illustrative example. The user interface 344 is an illustrative example of one implementation of the display 214 of FIG. 2.

In another embodiment, the user interface 344 may also include peripheral devices, such as a keyboard and mouse, for example.

In one example during operation of the aircraft 306, the sensor system 312 sends sensor data to the processor 308, where the data is monitored by the onboard health manager 336 and/or transmitted to remote health manager 346 at remote location 304 for processing. The data may be sent continually or the data transmission may be triggered by an event, such as starting engine systems, activating a portion of the aircraft systems that is being monitored, or the aircraft becoming airborne, for example. The event may also be, for example, a periodic event, such as the expiration of a timer. In an illustrative example, the periodic event may occur every second, every minute, or after some other suitable period of time. In other examples, the event may be non-periodic. For example, the data may be received when the landing gear is activated. The data may continue to be received until the aircraft reaches a taxiway from the runway, the gate or some other location. This allows for real-time management of the operating health of the aircraft. Generally, real-time may refer to sending (or otherwise processing) the data to and/or from the systems at substantially the same time as the data is generated and/or received, in an illustrative example. The data transmitted may be synchronous or asynchronous, in an illustrative example.

In the present example, the sensor system 312 detects a number of different measurements from the aircraft systems 310. The onboard health manager 336 and/or the remote health manager 346 may continually or periodically monitor the data received to perform a number of processes to determine health conditions of the aircraft. The remote health manager 346 may be particularly useful to receive big data from a fleet of many aircraft and to perform a number of processes including, without limitation, processing the data in a time domain and a frequency domain, identifying potentially important data points from processing the data in the time and frequency domains, recording the identified data points (perhaps in addition to recording all of the received data), analyzing the identified data points to determine health conditions of the fleet of aircraft, performing or triggering some real-world action based on the health conditions of the fleet of aircraft, and/or any other suitable processes. To provide some context, large commercial airline fleets commonly include greater than a few hundred aircraft and large military fleets may have thousands of aircraft, each of which may be configured to send, when in operation, streams of data from dozens or hundreds of sensors, along with other data to a health manager or other remote computing system for processing and storage of the data.

In one example, the onboard health manager 336 is configured to generate processing results by processing the received data in the time and frequency domains, and to identify differences in and/or between processing results of adjacent sets of data of the received data. The onboard health manager 336 may then identify potentially important data points as data points that correspond to identified differences that are greater than or equal to one or more predefined thresholds (or that correspond to identified differences that have absolute values that are greater than or equal to the predefined thresholds). Generally, the predefined thresholds may be any value that represents a normal operation value, may be a range of normal operation values, may represent a value or values that define an upper and/or lower bound of a range of normal operation values, and/or may correspond to a percentage difference between particular data points or sets of data points, for example. Responsive to identifying the important data points, the remote health manager 346 may also generate an alert with information about the health of the aircraft or components thereof. Further, the remote health manager 346 may display the alert through the user interface 320.

The illustration of a transportation environment 300 in FIG. 3 is not meant to imply physical or architectural limitations to the manner in which different embodiments may be implemented. Other components in addition and/or in place of the ones illustrated may be used. Some of the illustrated components may be unnecessary in some embodiments. Also, the blocks are presented to illustrate some functional components. One or more of these blocks may be combined and/or divided into different blocks when implemented in different embodiments.

Figure 4:
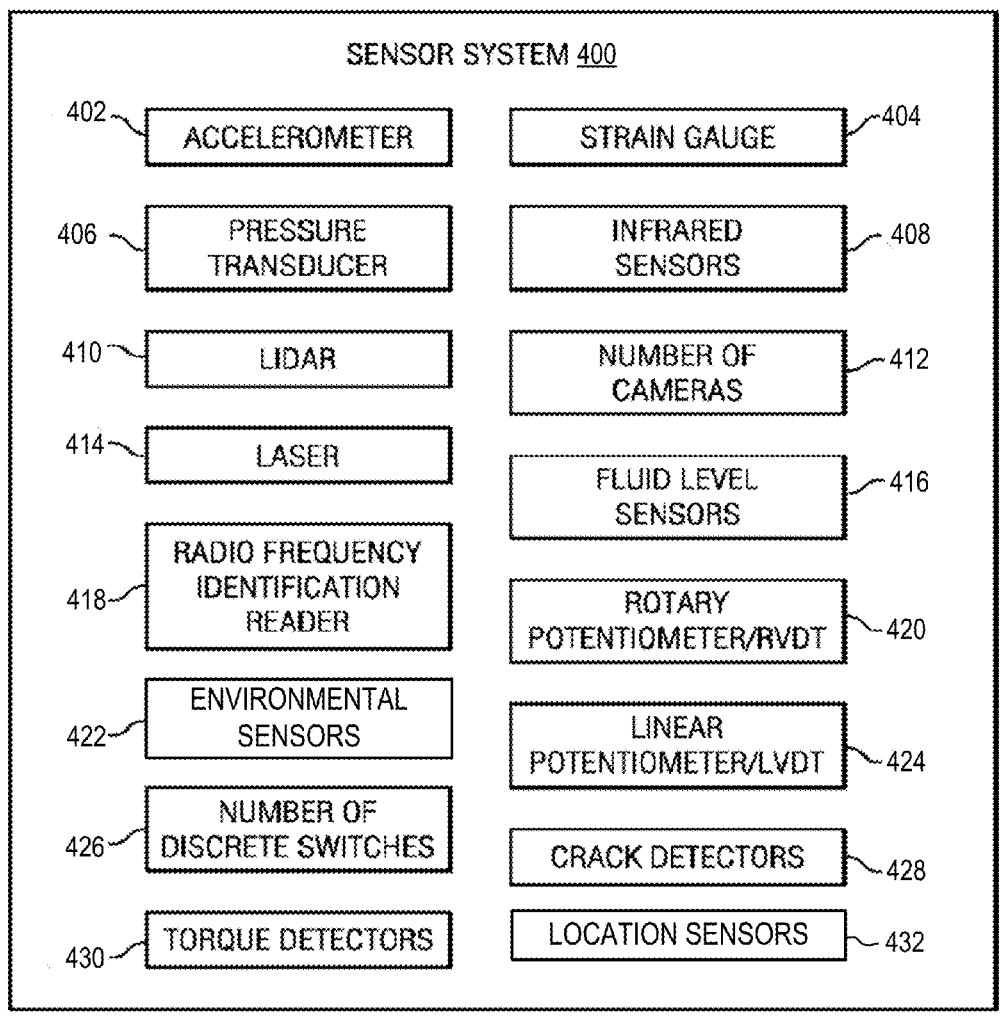
FIG. 4 is a block diagram of a sensor system according to an example embodiment.

With reference now to FIG. 4, an illustration of a sensor system 400 is depicted in accordance with an embodiment. The sensor system 400 is an illustrative example of one implementation of sensor system 312 in FIG. 3. In the illustrated example, the sensor system 400 may include, without limitation, one or more of each of an accelerometer 402, strain gauge 404, pressure transducer 406, infrared sensors 408, LIDAR 410, number of cameras 412, laser 414, fluid level sensors 416, radio frequency identification reader 418, rotary potentiometer 420, environmental sensor 422, linear potentiometer 424, discrete switches 426, crack detectors 428, torque detectors 430, and location sensors 432.

Generally, the accelerometer 402 measures the acceleration of an object, such as the aircraft 306 in FIG. 3. The accelerometer 402 may also measure the vibration of actuators, in an illustrative example. The strain gauge 404 measures strain experienced by an object, such as the aircraft 306. Measurements taken by the strain gauge 404 may be used to calculate the weight of the object, such as the aircraft 306, or the torque of brakes, for example. The pressure transducer 406 measures the force per unit area and generates a signal as a function of the pressure imposed. The infrared sensors 408 include one or more of infrared imaging sensors that detect infrared signals, which can be used to measure the temperature of landing gear and engine components, for instance.

The Lidar 410 utilizes optical remote sensing technology to measure properties of scattered light to measure component wear and damage, such as tire wear and damage profiles, for example. The cameras 412 may be one more devices used to capture images, including black and white cameras, color cameras, thermal imaging cameras, video cameras, and the like, which can be used to inspect wear and damage of vehicle components, such as on tires and brakes, for instance. The laser 414 emits electromagnetic radiation which can be used to measure component wear and damage profiles, such as tire or wheel wear and damage profiles, for example. The fluid level sensors 416 are a number of sensors configured to detect the level of a consumable fluid. The fluid level sensors 416 may be, in one illustrative example, capacitive probes that measure the level of a fluid in a reservoir.

The radio frequency identification tag reader 418 detects and reads information from radio identification tags associated with vehicle components. The rotary potentiometer 420, or a rotary variable differential transformer (RVDT), is a device to measure the rotary position and/or movement of a number of components or the relationship between a number of components. In one example, the rotary potentiometers and RVDT may be used to monitor the extension of a landing gear strut. The environmental sensors 422 may include devices for measuring temperature (e.g., ambient temperature, component temperature, and/or any other suitable temperature), air pressure, humidity, air quality, and the like. The linear potentiometer 424, or a linear variable differential transformer (LVDT), measures the linear position and movement of a number of components, and can be used to measure the wear of landing gear components, such as brake wear, for example.

The discrete switches 426 may be used to determine where a number of components are located. For example, the discrete switches 426 may be configured to measure an actuator if an actuator is locked in the open or closed position. The time between the open or closed position can be used to determine actuation time which can infer the health of the actuator, for example. The crack detectors 428 are sensors used to detect the presence of cracks in components. The torque detectors 430 are sensors that detect the amount of torsional load for a number of components. For example, the torque detector can be used to measure the braking force or the force applied by a rotary actuator. The location sensors 432 are sensors for tracking a location or position of the vehicle, and may include, for example, GPS sensors, altimeters, gyroscopes, and the like.

The illustration of a number of sensors 400 in FIG. 4 is not meant to imply physical or architectural limitations to the manner in which different embodiments may be implemented. Other components in addition to and/or in place of the ones illustrated may be used. Some components may be unnecessary in some embodiments. Also, the blocks are presented to illustrate some functional components. One or more of these blocks may be combined and/or divided into different blocks when implemented in different embodiments.

Figure 5:
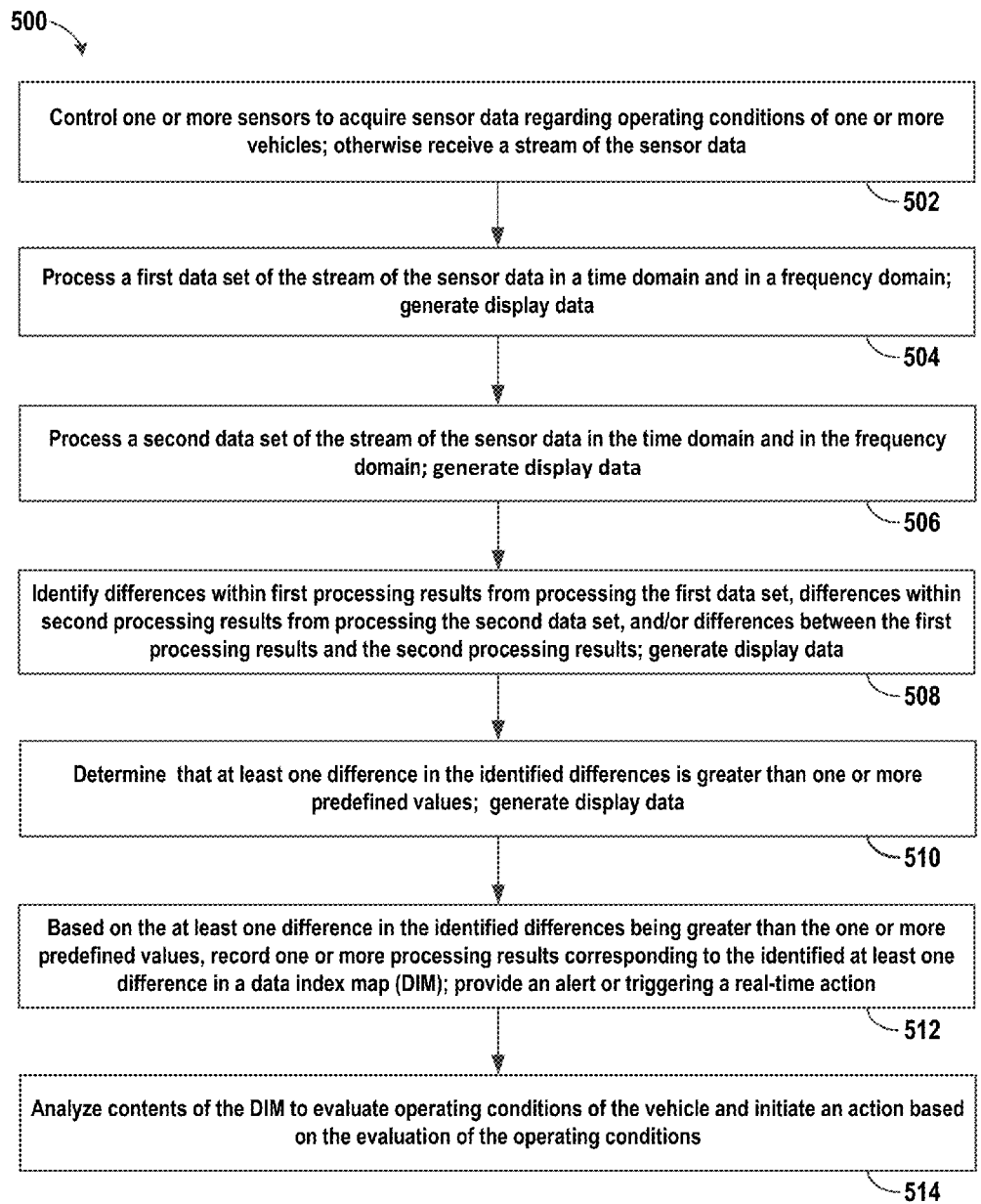
FIG. 5 is a flowchart of a process for performing data analytics according to an example embodiment.

FIG. 5 shows a flowchart of an example method 500 for performing analytics on a stream of sensor data, according to one embodiment. The method 500 shown in FIG. 5 presents an embodiment that may be performed within the embodiments of FIGS. 1-4, for example. Thus, devices and systems disclosed herein may be used or configured to perform logical functions presented in FIG. 5. In some instances, components of the devices and systems may be configured to perform the functions such that the components are actually configured and structured (with hardware and/or software) to enable such performance. In other examples, components of the devices and systems may be arranged to be adapted to, capable of, or suited for performing the functions. The method 500 may include one or more operations, functions, or actions as illustrated by one or more of blocks 502-514. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 502, the method 500 includes controlling one or more sensors to acquire sensor data regarding operating conditions of one or more vehicles, and/or otherwise receiving a stream of the sensor data. More particularly, one or more computing devices, such as the servers 104, 106, the client computers 110-114, computing devices incorporated in the aircraft 116, 118, the data processing system 200, the health managers 336, 346, and/or other computing devices disclosed herein or that would otherwise be apparent to one of ordinary skill may be configured to control the sensors 312 and/or the sensor system 400 to measure and acquire sensor data regarding operating conditions of the vehicle. At block 502, a client computer 110-114 or the remote health manager 346, for example, may receive the stream of the sensor data. In one example, this stream of the sensor data qualifies as big data, such as data that is received in real time from a variety of different sources at high volumes and velocities.

According to blocks 504 and 506, the computing device(s) process a first data set and a second data set, respectively, in a time domain and in a frequency domain. In accordance with one embodiment, the first and second data sets are adjacent data sets of the received stream of sensor data. Optionally, the first and second data sets may include the same number of K data points and/or may overlap each other. At block 508, the computing device(s) identify differences within first processing results from processing the first data set, differences within second processing results from processing the second data set, and/or differences between the first processing results and the second processing results. Further, at blocks 504-508, the computing device(s) may also generate data for displaying one or more of the first processing results, the identified differences in the first processing results, the second processing results, the identified differences in the second processing results, or the identified differences between the first processing results and the second processing results. This display data may be incorporated into a graphical user interface generated by the display 214, for example, and helps a user to visualize and monitor the data and processing results from the data in real-time.

At block 510, the computing device(s) determine that at least one difference in the identified differences is greater than or equal to one or more predefined thresholds. In one example, a user may provide an input to the computing device(s) that at least one difference in the processing results is greater than or equal to one or more predefined thresholds. Alternatively or in conjunction, the computing device(s) may perform the determination without user interaction. At block 510, the computing device(s) may also generate display data relating to the determination. At block 512, based on determining that the at least one difference in the identified differences is greater than or equal to the one or more predefined thresholds, the computing device(s) records one or more processing results corresponding to the identified at least one difference in a data index map (DIM), or in some other suitable data structure for storing, indexing, or otherwise organizing processing results corresponding to the identified at least one difference. The DIM may be stored in addition to the entire received stream of data, and generally provides a new and potentially much smaller temporal data set that captures key parameter values and critical changes in the data.

In another example, at block 510, the computing device(s) determine that at least one difference in the identified differences is greater than or equal to one or more first predefined thresholds and responsively records corresponding data in the DIM. If at least one difference is greater than or equal to the one or more first predefined thresholds, the computing device(s) may further determine that at least one difference in the identified differences is greater than or equal to one or more second predefined thresholds. In this example, the one or more second predefined thresholds indicate a greater identified difference or more critical identified difference than the one or more first predefined thresholds. For instance, the one or more first predefined thresholds may represent normal operating thresholds, and the one or more second predefined thresholds may represent critical operating thresholds. At block 512, based on determining that the at least one difference in the identified differences is greater than or equal to (or an absolute value of the at least one difference is greater than or equal to, or less than, depending on the particular implementation) the one or more second predefined thresholds, the computing device(s) generates data for providing an alert (e.g., an audible and/or visual alert) that real-time action relating to operation of the vehicle is required, or the computing device(s) may otherwise trigger the real-time, real-world action or process. In another example, at block 512, the computing device(s) may generate data for providing the alert or otherwise trigger the action in response to determining that the at least one difference is greater than or equal to the one or more first predefined thresholds.

Illustratively, the computing device(s) may determine that a difference in the processing results is greater than or equal to a first predefined threshold and responsively record corresponding data, and the computing device(s) may further determine that the difference is greater than or equal to a second predefined threshold and responsively alert a user to bring the vehicle to a suitable facility for repair, maintenance, or other diagnostics. The computing device(s) may also instruct personnel or other systems at the facility to be prepared with the necessary resources to perform the work once the vehicle arrives at the facility.

At block 514, the computing device(s) analyzes contents of the DIM or other modified data structure to evaluate operating conditions of the vehicle. In one example, the DIM provides a useful index that can be effectively analyzed to identify data segments in the entire stream of data, which is also stored, for further analysis to evaluate the operating conditions of the vehicle. Further, at block 514, the computing device(s) may initiate an action based on the evaluation of the operating conditions. For example, at block 514, the computing device(s) may analyze the DIM to evaluate the health of the vehicle, and may then responsively update a maintenance schedule of the vehicle, such as by shifting maintenance from unscheduled to scheduled (or from scheduled to unscheduled), and by requesting the deployment of personnel, parts, and equipment to perform maintenance or repairs. At block 514, the computing device may also initiate other actions based on the evaluation of the operating conditions, such as determining operating efficiency of the vehicle and/or determining a travel route of the vehicle. In another example, the computing device(s) may analyze the contents of the DIM at block 514 in response to receiving an instruction to investigate an accident or a component failure.

In one example, the analyses performed by the computing device(s) at block 514 may be triggered by a real-world occurrence, such as an equipment failure or accident, which triggers an instruction to investigate the real-world occurrence. In another example, some or all of the analyses performed by the computing device(s) at block 514 may be performed according to a predetermined schedule.

Referring back to blocks 504, 506, in one example, the computing device(s) process the data sets in the frequency domain by calculating power spectrum densities (PSDs) of each data set. These PSD calculations may use fast Fourier transform (FFT) or autoregressive-moving-average (ARMA) techniques. FIGS. 6A-6C illustrate PSD display data corresponding to first and second data sets. More particularly, FIG. 6A illustrates a PSD 600 corresponding to a first set of K data points, FIG. 6B illustrates a PSD 602 corresponding to a second set of K data points, and FIG. 6C illustrates the PSDs 600, 602 together, which may help to visualize differences between the PSDs.

In this example, at block 508, the computing device(s) identifies differences between the PSDs 600, 602, such as by identifying differences in the areas encompassed by the PSDs and/or by identifying differences between the PSDs at particular frequencies. At block 510, the computing device(s) determines whether at least one difference between the PSDs 600, 602 (or an absolute value of the difference) is greater than or equal to a predefined threshold (e.g., a particular threshold value and/or a percentage difference). In another example, at block 510, the computing device(s) may determine whether at least one difference between the PSDs 600, 602 is less than or equal to the predefined threshold. Then at block 512, based on determining that at least one difference is greater than or equal to the predefined threshold, the computing device(s) records corresponding data. Generally, each data point in the data stream is associated with a time stamp. In the present example, at block 512, if the difference of PSD areas for adjacent first and second K data points is greater than or equal to a predefined threshold, the computing device(s) records the following data in the DIM:

TABLE 1

DIM data relating to PSD areas

| Time Index | Starting time for the first K data points | Starting time for the second K data points |
|---|---|---|
| The number of data points | Integer value | Integer value |
| Upper frequency limit | Integer value | Integer value |
| PSD Area | Non-integer value | Non-integer value |

Alternatively or in combination, at block 512, if the maximum difference of PSD values at a given frequency for adjacent first and second K data points is greater than or equal to a predefined threshold, the computing device(s) records the following data in the DIM:

TABLE 2

DIM data relating to PSD values at a given frequency

| Time Index | Starting time for the first K data points | Starting time for the second K data points |
|---|---|---|
| The number of data points | Integer value | Integer value |
| Frequency | Integer value | Integer value |
| PSD | Non-integer value | Non-integer value |

The processed data in FIGS. 6A-6C, in one example, may represent vibrations in a component of a vehicle, such as an aircraft engine. In other examples, the processed data in FIGS. 6A-6C may represent one or more of acoustic data, temperature data, cabin air pressure data, among other example data. In this example, if either or both of the difference in the PSD areas or the difference in the PSD values between the first and second vibration data sets is greater than or equal to a predetermined threshold, this may represent an anomaly in the operation of the engine. In which case, according to embodiments of the present disclosure, corresponding data and information can be stored in the DIM. Further, the difference in the PSD areas and/or the difference in the PSD values may trigger an action, such as causing the next engine maintenance operation to be accelerated, or to instruct an operator of the aircraft to make an unscheduled stop at the next closest maintenance facility.

At blocks 504, 506, the computing device(s) may also process the data sets in the time domain by calculating, for each of the first and second data sets, a variance between a previous set of K data points and a current set of K data points. FIG. 7 illustrates variance display data corresponding to first, second, and third data sets. More particularly, FIG. 7 illustrates a variance 700 corresponding to a first set of K data points, a variance 702 corresponding to a second set of K data points, and a variance 704 corresponding to a third set of K data points. The variance of a set of data points may be calculated in accordance with the formula: $s^2 = \Sigma(x_i - \bar{x})^2/(n-1)$, wherein $s^2$ is the variance of the set of data points, $\bar{x}$ is the sample mean, $x_i$ is the ith element from the set of data points, and is the number of data points in the set.

In this example, at block 508, the computing device(s) identify differences between the variances 700-704 and, at block 510, the computing device(s) determine whether at least one difference between the variances is greater than or equal to a predefined threshold (e.g., a particular threshold value and/or a percentage difference). Then at block 512, based on determining that at least one difference is greater than or equal to the predefined threshold, the computing device(s) may record corresponding data in the DIM, such as the following data:

TABLE 3

DIM data relating to variances

| Time Index | Starting time for the first K data points | Starting time for the second K data points |
|---|---|---|
| The number of data points | Integer value | Integer value |
| Variance | Non-integer value | Non-integer value |

The processed data in FIG. 7, in one example, may represent elevation changes of the vehicle, vibration of one or more components of the vehicle, temperature changes outside or inside the vehicle or of one or more components of the vehicle, cabin air pressure, among other example data. In this example, if the variance between the first and second vibration data sets is greater than or equal to a predetermined threshold, this may represent unexpected altitude fluctuations of the vehicle. In which case, according to embodiments of the present disclosure, corresponding data and information can be stored in the DIM. Further, the differences in the variances may trigger an action, such as generating an alert to an operator of the vehicle and/or to another user that is monitoring operating conditions of the vehicle, or to actuate other safety or position tracking measures of the vehicle.

Figure 8:
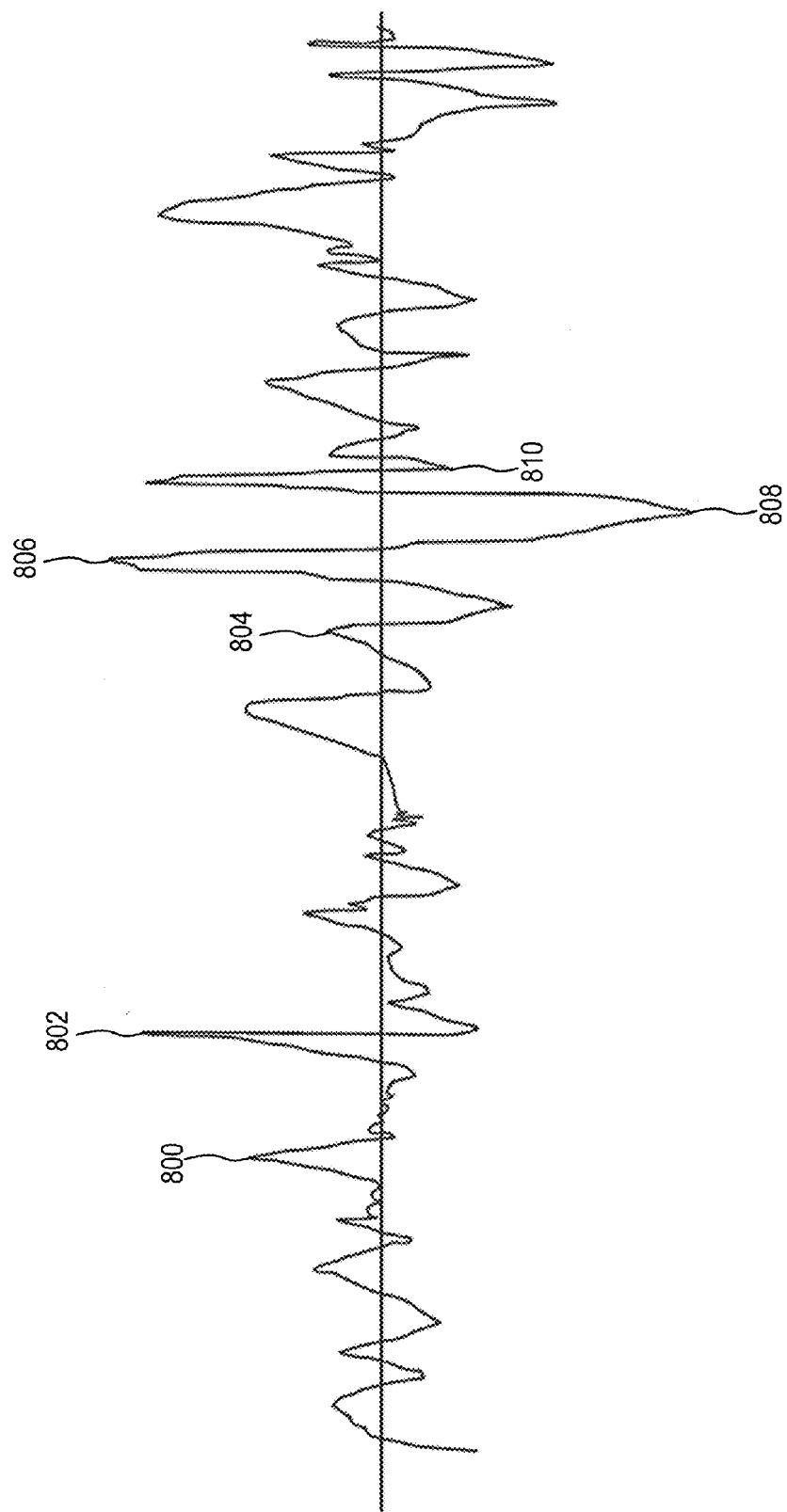
FIG. 8 illustrates time domain display data according to another example embodiment.

In another example, at blocks 504, 506, the computing device(s) may also process the data sets in the time domain by identifying, for each of the first and second data sets, peak and valley data points. FIG. 8 illustrates time-domain display data corresponding to a particular data set. Perhaps notably, FIG. 8 illustrates first adjacent peak data points 800, 802, second adjacent peak data points 804, 806, and adjacent valley data points 808, 810. In this example, at block 508, the computing device(s) identify differences between adjacent peak data points, adjacent valley data points, and/or adjacent peak and valley data points. At block 510, the computing device(s) determine whether at least one difference between adjacent data points in the time domain is greater than or equal to a predefined threshold (e.g., a particular threshold value and/or a percentage difference). Then at block 512, based on determining that at least one difference is greater than or equal to the predefined threshold, the computing device(s) may record corresponding data in the DIM, such as the following data:

TABLE 4

DIM data relating to peak/valley values

| Time Index | Time at the first peak or valley data point | Time at the second peak or valley data point |
|---|---|---|
| Peak or valley value | Non-integer value | Non-integer value |

The data in FIG. 8, in one example, may represent one or more aspects of air quality in and/or around the vehicle. In other examples, the data in FIG. 8 may be raw data in the time domain that represents vibration, pressure, acoustics, temperature, moisture, among other examples. In this example, if the difference between adjacent peak and/or valley data points is greater than or equal to a predetermined threshold, this may represent a potentially dangerous air quality situation of the vehicle. In which case, according to embodiments of the present disclosure, corresponding data and information can be stored in the DIM. Further, the differences in the peak/valley data points may trigger an action, such as activating air filters and/or adjusting a route of the vehicle to travel to an area having better air quality.

Figure 9:
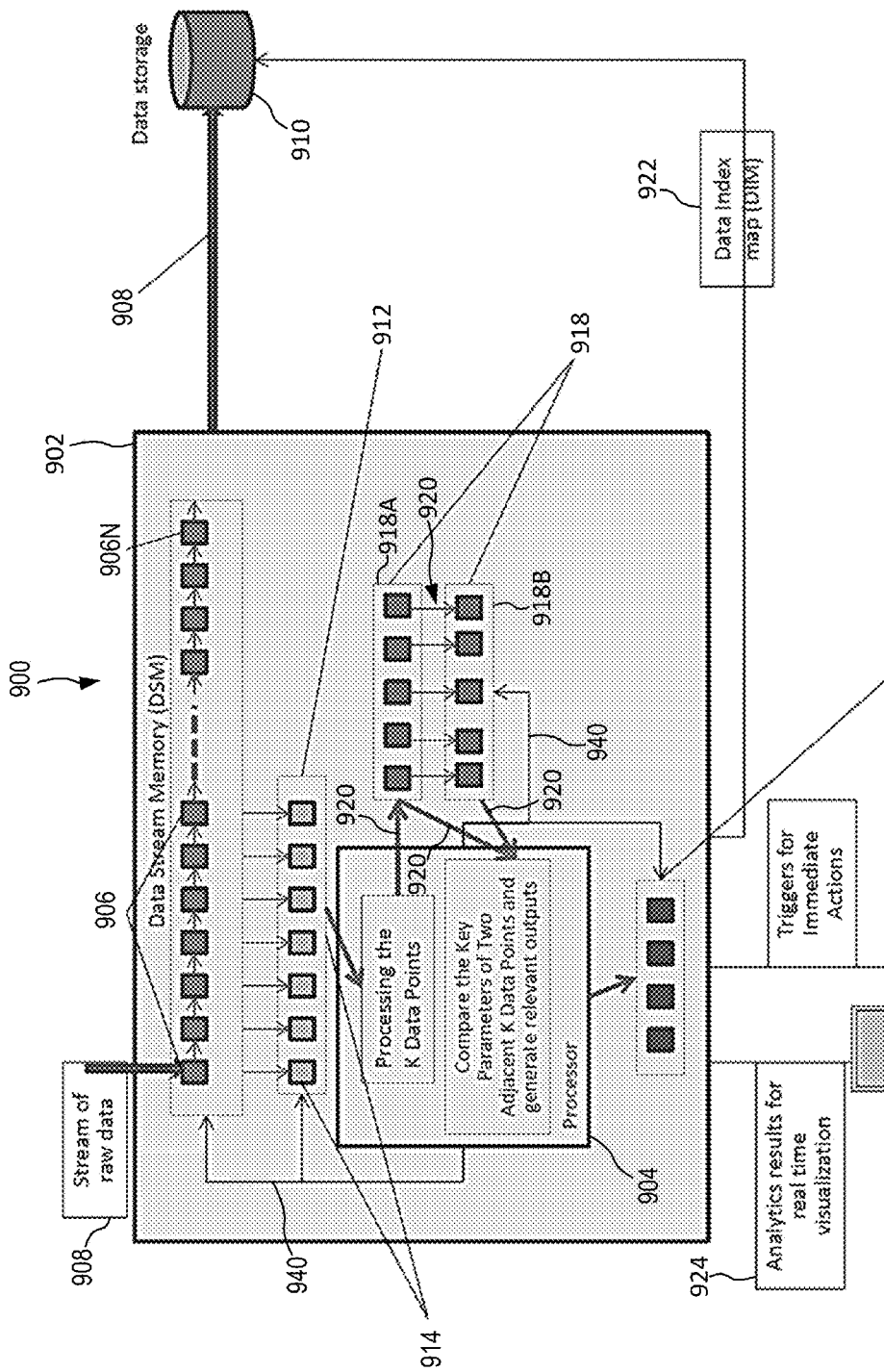
FIG. 9 is a diagrammatic view of a system including a single core processor according to an example embodiment.

Referring now to FIG. 9, an example system 900 for performing data analytics in accordance with an example embodiment is shown. The system 900 includes a health manager 902 that incorporates a processor 904 (e.g., a single core high performance programmable processor) and various memory partitions or units. In the present example, the memory units include data stream memory (DSM) units 906 configured as a pathway for a received raw data stream 908 to a permanent data storage 910, input data memory (IDM) units 912 configured as input data buffers for a copy 914 of the received data stream, output data memory (ODM) units 916 configured as output data buffers, and a first set of data processing result (DPR) memory units 918A and a second set of DPR memory units 918B that are configured to store processing results 920.

Generally, in use, the processor 904 is coupled to the various memory units and is configured with hardware and/or software to control various functions of the health manager 902. For instance, the processor 904 is configured to provide the data stream 908 through the DSM units 906 to the permanent data storage 910. The processor 904 is also configured to copy a first data set of K data points in the data stream from the DSM units 906 to the IDM units 912 and to generate a first processing result of the first data set using predefined analytics algorithms (e.g., the time domain and frequency domain processes described hereinabove).

In the present example, the processor 904 is further configured to move the first processing result to the first set of DPR memory units 918A, and then to copy a next, adjacent set of K data points (e.g., a second data set of K data points) in the data stream from the DSM units 906 to the IDM units 912. The processor 904 may then generate a second processing result of the second data set using the predefined analytics algorithms, move the first processing result in the first set of DPR memory units 918A to the second set of DPR memory units 918B, and move the second processing result to the first set of DPR memory units. In this example, the processor 904 is configured to identify that at least one difference within the first processing result in the first DPR memory units 918A, within the second processing result in the second DPR memory units 918B, or between the first processing result and the second processing result stored in the first and second DPR memory units, respectively, is greater than or equal to a predefined threshold, and to record one or more processing results corresponding to the identified at least one difference in a data index map (DIM) 922 or other suitable data structure, which is communicated to the storage 910. Further, the processor 904 may generate data 924 for visualizing the processing of the data sets on a display 926, and may also trigger immediate actions based on the processing of the data sets, as described above. Generally, the processor 904 will repeatedly move and process new data sets through the memory units as the data stream 908 is received and moved through the DSM units 906 to the data storage 910.

FIG. 9 also illustrates logic and timing control lines 940 from the processor 904 to the various memory units. In one example, the DSM 906 includes N total memory units ending at memory unit 906N, and each memory unit receives one data point of the data stream 908 at a time in a first-in-first-out fashion. Data flows into the DSM 906 by sequentially "pushing" each data point toward the last memory unit 906N and then out to the data storage 910 at a given rate of F data points per second. In the present example, the processor 904 is configured to provide logic and timing control by determining if the first K memory units of the DSM 906 are filled, and if so, copying these K data points (e.g., the first data set) from the DSM to the IDM 912 in parallel with the receipt of the data points in the DSM. The processor 904 repeats this process of waiting until first K memory units of the DMS 906 are filled with the next adjacent set of K data points and coping this next set of K data points (e.g., the second data set) from the DSM to the IDM 912 in parallel with providing the data stream through the DSM units to the permanent storage.

As the next set of K data points is being populated into the DSM 906, the processor 904 performs the functions discussed above of processing the first data set and moving the processing result through the DPR memory units 918. In an example, the processor 904 is configured to move the processing results in the first set of DPR memory units 918A to the second set of DPR memory units 918B in parallel with generating the a next processing result.

Generally, the total number of the DSM units 906N is greater than or equal a total number of the IDM units 912, and the plurality of memory units and the processor 904 are configured such that a time needed to provide the data stream through the DSM units to the data storage 910 is greater than or equal to an analytics time. In an example, the analytics time is a time duration starting when a particular data set of K data points is copied into the IDM units 912 and ending when the processing results 920 corresponding to the particular data set are moved out to the ODM 916.

Figure 10:
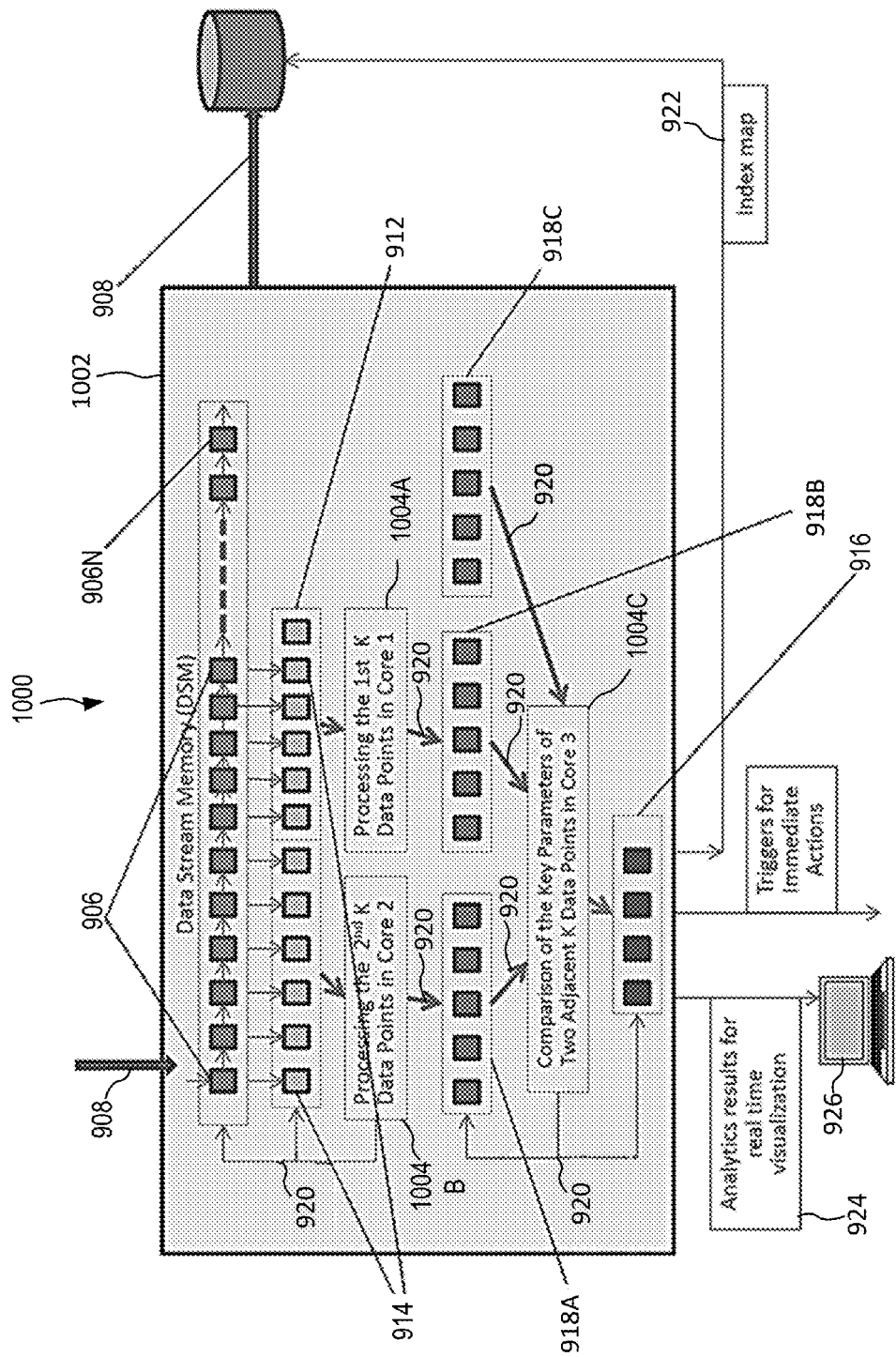
FIG. 10 is a diagrammatic view of a system including a multicore processor according to an example embodiment.

FIG. 10 illustrates another example system 1000 that is similar to the system 900 of FIG. 9, but utilizes a multicore processor. In the present example, the system 1000 includes a health manager 1002 and a processor 1004 (e.g., a multicore high performance programmable processor) that has first, second, and third processor cores 1004A, 1004B, 1004C, respectively. The system 1000 further includes various memory partitions or units. Similarly to the system 900, the memory units in FIG. 10 include data stream memory (DSM) units 906 configured as a pathway for a received data stream 908 to a permanent data storage 910, input data memory (IDM) units 912 configured as input data buffers for a copy 914 of the received data stream, output data memory (ODM) units 916 configured as output data buffers, and a first set of data processing result (DPR) memory units 918A, a second set of DPR memory units 918B, and a third set of DPR memory units 918C that are configured to store processing results 920.

Generally, in use, the processor 1004 is coupled to the various memory units and is configured with hardware and/or software to control various functions of the health manager 1002. For instance, the processor 1004 is configured to provide the data stream 908 through the DSM units 906 to the permanent data storage 910. The processor 1004 is also configured to copy a first data set of K data points and a second adjacent data set of K data points in the data stream from the DSM units 906 to the IDM units 912. Further, the processor is configured to generate, using the first processor core 1004A, a first processing result of the first data set using predefined analytics algorithms (e.g., the time domain and frequency domain processes described hereinabove). In addition, the processor is configured to generate, using the second processor core 1004B, a second processing result of the second data set using the same predefined analytics algorithms.

In the present example, the processor 1004 is further configured to move the first processing result to the first set of DPR memory units 918A, and to move the second processing result to the second set of DPR memory units 918B. In the present example, the third processor core 1004C is configured to identify that at least one difference within the first processing result in the first DPR memory units 918A, within the second processing result in the second DPR memory units 918B, or between the first processing result and the second processing result stored in the first and second DPR memory units, respectively, is greater than or equal to a predefined threshold, and to record one or more processing results corresponding to the identified at least one difference in a data index map (DIM) 922 or other suitable data structure, which is communicated to the storage 910. Further, the processor 1004 may generate data 924 for visualizing the processing of the data sets on a display 926, and may also trigger immediate actions based on the processing of the data sets, as described above. Generally, the processor 1004 will repeatedly move and process new data sets through the memory units as the data stream 908 is received and moved through the DSM units 906 to the data storage 910. In the present example, as the processor 1004 receives and processes a next data set of K data points, the processor moves the processing results from the first DPR memory units 918A to the third DPR memory units 918C, and moves the processing results from the second DPR memory units 918B to the first DPR memory units 918A.

Similarly to FIG. 9, FIG. 10 also illustrates logic and timing control lines 1040 from the processor 1004 to the various memory units. In the present example, one of the three processor cores may serve as a master core to manage logic and data transfer among the cores. This master core is configured to provide logic and timing control by determining if the first K memory units and the next, consecutive second K memory units of the DSM 906 are filled, and if so, copying these first K data points (e.g., the first data set) and the second K data points (e.g., the second data set) from the DSM to the IDM 912 in parallel with the receipt of the data points in the DSM. As the next two sets of data points is being populated into the DSM 906, the processor 1004 performs the functions discussed above of processing the first and second data sets and moving the processing results through the DPR memory units 918.

Generally, the total number of the DSM units 906N in FIG. 10 is greater than or equal a total number of the IDM units 912, and the plurality of memory units and the processor 904 are configured such that a time needed to provide the data stream through the DSM units to the data storage 910 is greater than or equal to an analytics time. In an example, the analytics time is a time duration starting when a particular data set of K data points is copied into the IDM units 912 and ending when the processing results 920 corresponding to the particular data set are moved out to the ODM 916.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

It should be understood that for the processes and methods disclosed herein, flowcharts show functionality and operation of possible implementations of respective embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method implemented by a computing device for data stream analytics comprising:
   controlling a sensor to acquire sensor data regarding operating conditions of a vehicle;
   receiving a stream of the sensor data;
   processing, by the computing device, a first data set of the stream of the sensor data in a time domain and in a frequency domain;
   processing, by the computing device, a second data set of the stream of the sensor data in the time domain and in the frequency domain, wherein the first data set and the second data set are adjacent data sets of the stream of the sensor data;
   identifying, by the computing device, one or more of differences within first processing results from processing the first data set, differences within second processing results from processing the second data set, or differences between the first processing results and the second processing results;
   determining, by the computing device, that at least one difference in the identified differences is greater than or equal to one or more predefined thresholds;
   based on determining the at least one difference in the identified differences being greater than or equal to the one or more predefined thresholds, recording, by the computing device, one or more processing results corresponding to the identified at least one difference in a data index map (DIM); and analyzing contents of the DIM to evaluate operating conditions of the vehicle.

2. The method of claim 1, wherein processing the first data set includes calculating a first power spectrum density (PSD) of the first data set, wherein processing the second data set includes calculating a second PSD of the second data set, and wherein determining that at least one difference in the identified differences is greater than or equal to the one or more predefined thresholds includes determining that a difference between the first PSD and the second PSD is greater than or equal to a predefined PSD difference threshold.

3. The method of claim 1, wherein processing the first data set in the time domain includes calculating a first variance between a previous data set of the stream of the sensor data and the first data set, wherein processing the second data set in the time domain includes calculating a second variance between the first data set and the second data set, and wherein determining that at least one difference in the identified differences is greater than or equal to the one or more predefined thresholds includes identifying that a difference between the first variance and the second variance is greater than or equal to a predefined variance difference threshold.

4. The method of claim 1, wherein processing the first data set in the time domain includes identifying first peak data points and first valley data points in the first data set, wherein processing the second data set in the time domain includes identifying second peak data points and second valley data points in the second data set, and wherein determining that at least one difference in the identified differences is greater than or equal to the one or more predefined thresholds includes identifying that a difference between adjacent peak data points in the first peak data points, adjacent valley data points in the first valley data points, adjacent peak data points in the second peak data points, or adjacent valley data points in the second valley data points is greater than or equal to a predefined difference threshold.

5. The method of claim 1, wherein the one or more predefined thresholds are one or more first predefined thresholds, and wherein the method further comprises:
determining, by the computing device, that at least one difference in the identified differences is greater than or equal to one or more second predefined thresholds, wherein the one or more second predefined thresholds indicate a greater identified difference than the one or more first predefined thresholds; and
based on determining the at least one difference in the identified differences being greater than or equal to the one or more second predefined thresholds, generating data for providing an audible and/or visual alert that real-time action relating to operation of the vehicle is required.

6. The method of claim 1, further comprising:
generating data for displaying one or more of the first processing results, the identified differences in the first processing results, the second processing results, the identified differences in the second processing results, or the identified differences between the first processing results and the second processing results.

7. The method of claim 1, wherein the vehicle is an aircraft, and further comprising, based on the evaluated operating conditions of the vehicle, at least one of updating a maintenance schedule of the vehicle, determining operating efficiency of the vehicle, determining a travel route of the vehicle, or investigating an accident or a component failure.

8. The method of claim 1, wherein data points in the stream of the sensor data are associated with timestamps, and further comprising, based on determining the at least one difference in the identified differences being greater than or equal to the one or more predefined thresholds, recording, in the DIM, timestamps associated with data points that correspond to the at least one difference that is greater than or equal to the one or more predetermined thresholds.

9. A system for data stream analytics comprising:
a plurality of memory units including data stream memory (DSM) units configured as a pathway for a data stream to a permanent data storage, input data memory (IDM) units configured as input data buffers, output data memory (ODM) units configured as output data buffers, and a first set of data processing result (DPR) memory units and a second set of DPR memory units, each of the first set of DPR memory units and the second set of DPR memory units configured to store processing results; and
a processor communicatively coupled with the plurality of memory units and configured to:
provide a data stream through the DSM units to the permanent data storage;
copy a first data set of the data stream from the DSM units to the IDM units;
generate a first processing result of the first data set using predefined analytics algorithms;
move the first processing result to the first set of DPR memory units;
copy a second data set of the data stream from the DSM units to the IDM units;
generate a second processing result of the second data set using the predefined analytics algorithms;
move the first processing result in the first set of DPR memory units to the second set of DPR memory units;
move the second processing result to the first set of DPR memory units;
identify that at least one difference within the first processing result, within the second processing result, or between the first processing result and the second processing result is greater than or equal to a predefined threshold; and
record one or more processing results corresponding to the identified at least one difference in a data structure.

10. The system of claim 9, wherein the first data set and the second data set are adjacent data sets in the data stream, and wherein each of the first data set and the second data set has the same numbers of data points.

11. The system of claim 9, wherein a total number of the DSM units is greater than or equal a total number of the IDM units, wherein the plurality of memory units and the processor are configured such that a time needed to provide the data stream through the DSM units to the permanent data storage is greater than or equal to an analytics time, and wherein the analytics time is a time duration starting when a particular data set is copied into the IDM units and ending when processing results corresponding to the particular data set are moved out the ODM.

12. The system of claim 9, wherein the processor is configured to copy the first data set from the DSM units to the IDM units in parallel with providing the data stream through the DSM units to the permanent storage, wherein the processor is configured to copy the second data set from the DSM units to the IDM units in parallel with providing the data stream through the DSM units to the permanent storage, and wherein the processor is configured to move the first processing result in the first set of DPR memory units to the second set of DPR memory units in parallel with generating the second processing result.

13. The system of claim 9, wherein the processor is further configured to generate data for displaying one or more of the first processing result, the second processing result, or the identified at least one difference.

14. The system of claim 9, wherein the predefined analytics algorithms include processing in a time domain and processing in a frequency domain.

15. The system of claim 9, wherein the data stream includes sensor data regarding operating conditions of a vehicle, and wherein data points in the data stream are associated with timestamps.

16. A system for data stream analytics comprising:
a plurality of memory units including data stream memory (DSM) units configured as a pathway for a data stream to a permanent data storage, input data memory (IDM) units configured as input data buffers, output data memory (ODM) units configured as output data buffers, and a first set of data processing result (DPR) memory units and a second set of DPR memory units, each of the first set of DPR memory units and the second set of DPR memory units configured to store processing results; and
a processor including at least three processor cores, wherein the processor is communicatively coupled with the memory units and configured to:
provide a data stream through the DSM units to the permanent data storage;
copy a first data set of the data stream and a second data set of the data stream from the DSM units to the IDM units;
generate, using a first processor core, a first processing result of the first data set using predefined analytics algorithms;
generate, using a second processor core, a second processing result of the second data set using the predefined analytics algorithms;
move the first processing result to the first set of DPR memory units;
move the second processing result to the second set of DPR memory units;
identify, using a third processor core, that at least one difference within the first processing result, within the second processing result, or between the first processing result and the second processing result is greater than or equal to a predefined threshold; and
record one or more processing results corresponding to the identified at least one difference in a data structure.

17. The system of claim 16, wherein the first data set and the second set are adjacent data sets in the data stream, and wherein each of the first data set and the second data set has the same numbers of data points.

18. The system of claim 16, wherein a total number of the DSM units is greater than or equal a total number of the IDM units, wherein the plurality of memory units and the processor are configured such that a time needed to provide the data stream through the DSM units to the permanent data storage is greater than or equal to an analytics time, and wherein the analytics time is a time duration starting when a particular data set is copied into the IDM units and ending when processing results corresponding to the particular data set are moved out the ODM.

19. The system of claim 16, wherein the processor is configured to copy the first data set and the second data set from the DSM units to the IDM units in parallel with providing the data stream through the DSM units to the permanent storage.

20. The system of claim 16, wherein the predefined analytics algorithms include processing in a time domain and processing in a frequency domain, wherein the data stream includes sensor data regarding operating conditions of a vehicle, and wherein data points in the data stream are associated with timestamps.

\* \* \* \* \*